United States Patent

[11] 4,302,813
[45] Nov. 24, 1981

[54] METHOD OF CONTROLLING OPERATION OF ROTARY MACHINES BY DIAGNOSING ABNORMAL CONDITIONS

[75] Inventors: Nobuo Kurihara; Mitsuyo Nishikawa; Shigeyoshi Kawano, all of Ibaraki, Japan

[73] Assignee: Hitachi, Ltd., Tokyo, Japan

[21] Appl. No.: 13,820

[22] Filed: Feb. 22, 1979

[30] Foreign Application Priority Data

Feb. 22, 1978 [JP] Japan .................. 53-18486

[51] Int. Cl.³ .................. G06F 15/46; G01N 29/00
[52] U.S. Cl. .................. 364/508; 364/494; 73/579; 73/462
[58] Field of Search .................. 364/494, 508; 73/462, 73/579, 593

[56] References Cited

U.S. PATENT DOCUMENTS

| | | | |
|---|---|---|---|
| 3,641,550 | 2/1972 | Lynas et al. | 73/579 X |
| 3,694,637 | 9/1972 | Edwin et al. | 73/593 X |
| 3,938,394 | 2/1976 | Morrow et al. | 364/508 X |
| 4,007,630 | 2/1977 | Noda | 73/593 |
| 4,060,707 | 11/1977 | Olsson et al. | 73/462 X |
| 4,078,434 | 3/1978 | Weberhofer | 73/579 X |
| 4,120,159 | 10/1978 | Matsumoto et al. | 364/494 X |
| 4,153,198 | 5/1979 | Eki et al. | 364/494 X |

*Primary Examiner*—Edward J. Wise
*Attorney, Agent, or Firm*—Craig and Antonelli

[57] ABSTRACT

The present invention relates to a method of controlling the operation of large rotary machines such as steam turbines and generators in a thermal power plant or nuclear power plant. More specifically, the invention relates to a method of controlling such operation as increasing or decreasing the speed of the rotary machines or stopping the operation of the rotary machines, by detecting vibration at the time of starting the operation or during the steady-speed operation, by analyzing the detected vibration signals to determine whether the operation is in normal condition or abnormal condition, and by detecting or forecasting the cause in case the operation is in abnormal condition.

11 Claims, 28 Drawing Figures

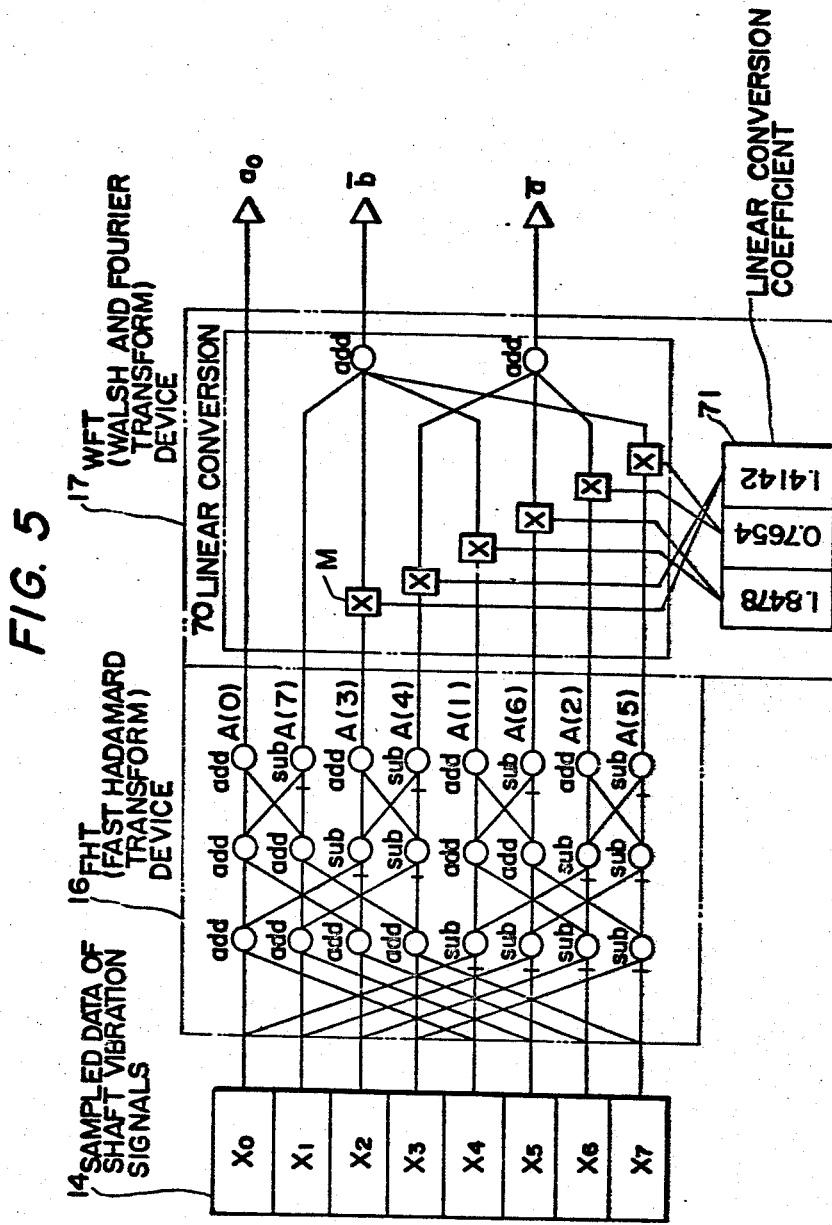

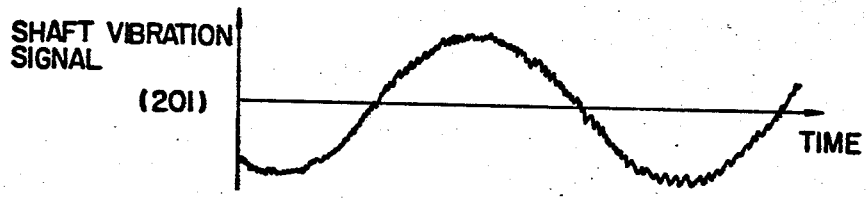
FIG. 12(a)
SHAFT VIBRATION SIGNAL (201)
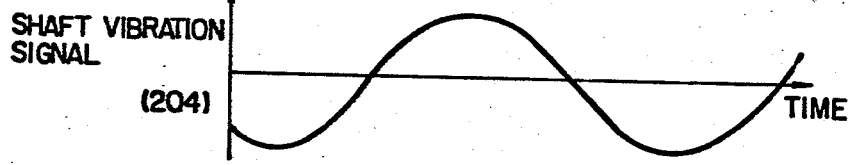
FIG. 12(b)
SHAFT VIBRATION SIGNAL (204)
FIG. 12(c)
SAMPLED HOLD SIGNALS (204')
FIG. 12(d)
DIGITAL SIGNALS OF SHAFT VIBRATION (205)
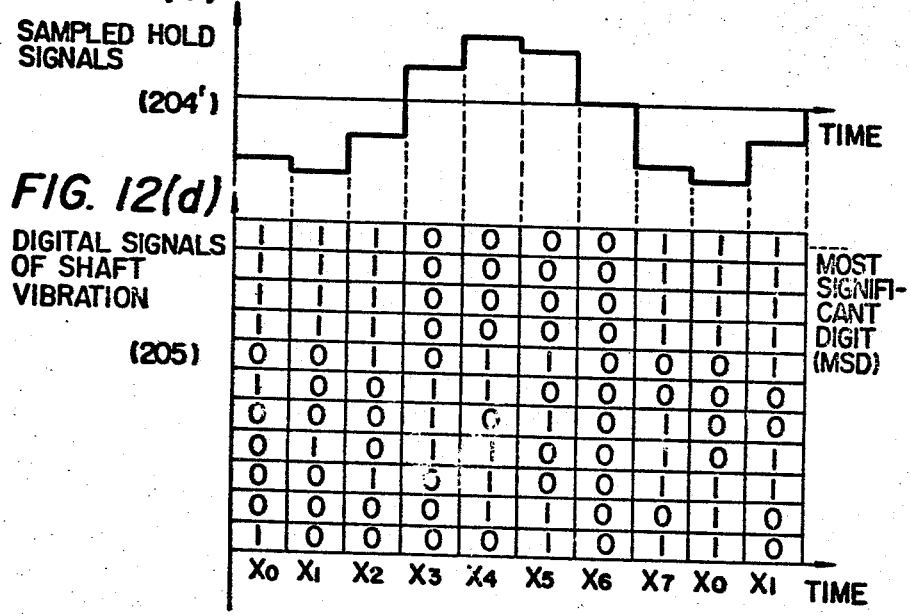

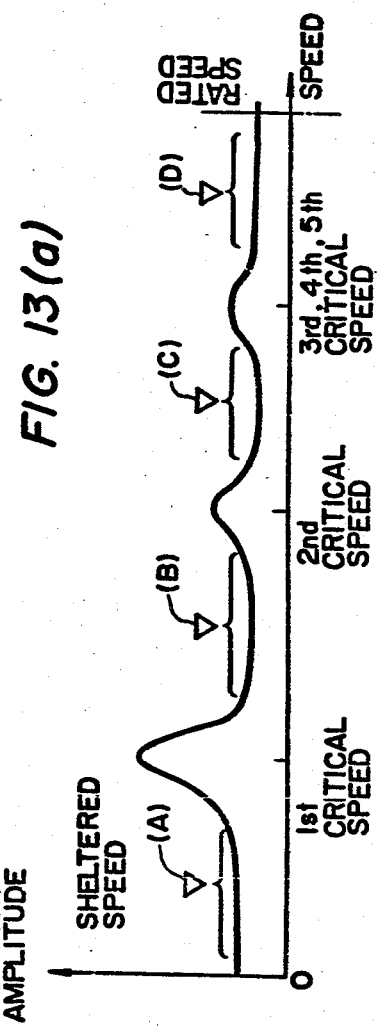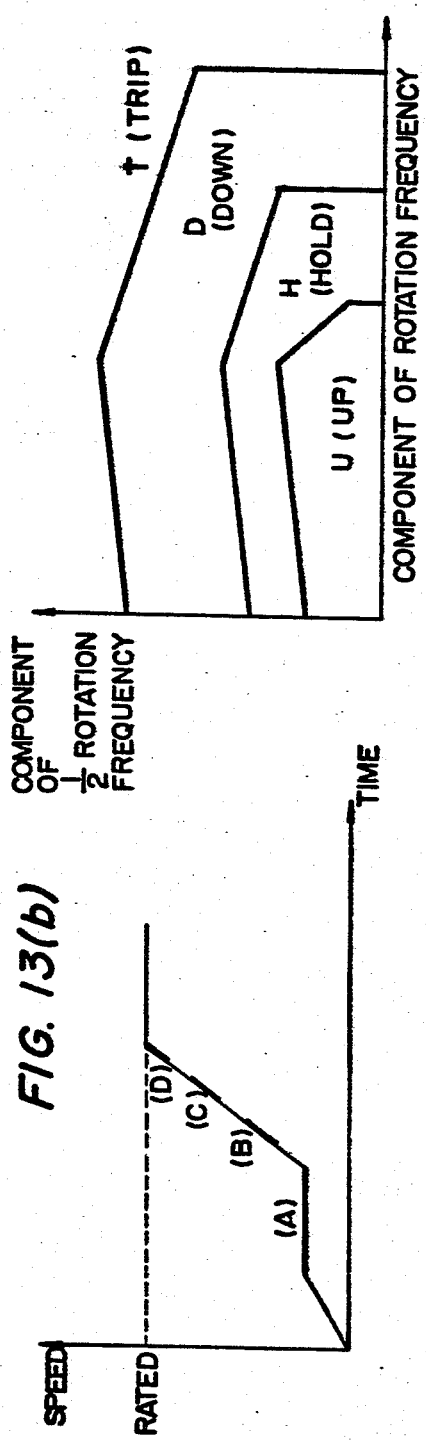

METHOD OF CONTROLLING OPERATION OF ROTARY MACHINES BY DIAGNOSING ABNORMAL CONDITIONS

BACKGROUND OF THE INVENTION

1. Field of the Invention

The present invention relates to a method of controlling the operation of large rotary machines such as steam turbines or generators while monitoring the vibrating state during the operation and especially at the time of starting.

The problem of vibration of rotary members occupies a great proportion of the maintenance time in operating thermal power stations, and the investigation of the causes and the countermeasures required to correctly grasp the situations require a detailed technical study. Further, the distance between the centers of the bearings, the weight of the rotors and the number of wheel chambers are on the increase accompanying the recent trend toward increased capacities of steam turbines, thereby causing the problem of vibration to become more complicated.

In regard to the control of power systems, on the other hand, it is also a modern trend to operate the thermal power plant to adjust the intermediate load while the base loads are being carried out by the nuclear power plant. The conventional weekly adjustment of load is now shifting toward the adjustment of load in daytime. Therefore, the machines of medium capacities in thermal stations are often stopped during such time zones as midnight in which the demand for power is small. In starting and stopping the operation of the plant, the abnormal condition tends to develop as compared with the case of steady-state operation. In starting the turbines particularly, the abnormal vibration tends to develop which is caused by the thermal unbalance.

In operating the steam turbines or generators, the operation staffs must pay their most careful attention at the time of starting the machines; the development of abnormal vibration during the starting presents a serious problem. Lack of proper treatment or the timing may result in a serious accident, particularly with the steam turbines which revolve at high speeds.

Even during the steady-state operation, any abnormal condition must be detected as early as possible and proper treatment must be effected in quickly so that it will not develop into a serious accident. The vibration during the steady-state operation also presents the same problem as that at the time of starting the operation.

According to the present invention, the normal or abnormal conditions of the rotary machines are monitored and discriminated, i.e., the states of the vibration signals are detected by vibration detectors which are installed, for example, on the bearings, and are monitored and discriminated, to thereby control the operation.

The present invention attained under such circumstances analyzes the detected vibration signals and stably controls the operation while locating the cause, in order to prevent any serious accident.

2. Description of the Prior Art

In starting the operation of a steam turbine, an apparatus for controlling the turbine speed operates a main steam valve or a by-pass valve responsive to a desired running speed of the turbine and a desired variation factor in running speed, so that the running speed is gradually increased.

In case vibration has developed during the speed-up, however, any one of the following three methods has so far been employed depending upon the amplitude of the vibration signals. The first method is to stop the speed-rising control by the speed-control apparatus and to switch the operation into a manual control so that the operation is controlled depending upon the discretion by the operating staffs. The second method is to maintain the running speed at a speed at which the vibration had developed, and not to effect the speed-rising control. The third method is to stop the turbine.

According to the first method, however, the control which is switched to the manual operation depends entirely upon the discretion of the operation staffs. Therefore, the persons skilled in this field of art are required. Further, the control of operation differs depending upon the individual staffs, and is not desirable.

According to the second method, there arises a problem of specific vibrating frequency during the running of rotary machines. Therefore, it is not necessarily desirable to maintain the running speed of the rotary machines at a speed at which the vibration is developed.

It has been known that the vibration increases in a critical speed region determined by the specific vibrating frequency of rotary machines consisting of turbines and generators directly coupled to the turbines. Accordingly, to maintain the running speed at a predetermined value as done by the abovementioned second method rather presents very dangerous conditions.

With the third method, on the other hand, the rotary members can be safely handled. The third method, however, is likely to effect unnecessary tripping. The vibration is caused by a variety of factors such as thermal unbalance, mechanical unbalance, state of a lubricating oil and running speed, and it is difficult to forecast the normal and abnormal conditions. Depending upon the cases, therefore, the vibration can be converged into a safe vibration region by maintaining the running speed of the rotary machines at a given value as accomplished by the abovementioned second method. Therefore, frequent use of the third method often results in unnecessary tripping. Conversely, if the standard for discretion is loosened to avoid the tripping, proper treatment may not often be effected under abnormal conditions.

What is important here is to determined whether it is safe to maintain the running speed thereby avoiding the tripping. Therefore, desirable effects will not be obtained unless it is determined in which speed region the rotary machine is rotating without maintaining the running speed in a dangerous region, and unless it is diagnosed what phenomenon is appearing as a cause of vibration.

Among the aforementioned causes of vibration, a countermeasure has been attempted in regard to the mechanical unbalance in order to minimize the development of vibration.

An example can be found, for instance, in J. W. Lund, J. Tonnesen: "Analysis and Experiments on Multi-Plane Balancing of a Flexible Rotor," ASME Paper No. 71-Vibr-74 (ASME Vibrations Conference, Tront, Canada, Sept. 8–10, 1971). This literature mentions to attain balance by detecting vibration in several places of a rotary machine, detecting the rotating speed, and calculating a correction weight by utilizing the method of least square. As for the method of measuring vibration, the literature schematically diagramatizes the instrumentation in FIG. 4, and gives the related description is a paragraph of "Instrumentation" (pp. 3 to 4).

Further, A. Clapis et al "Early Diagnosis of Dynamic Unbalances and of Misalignments in Large Turbogenerators", Energy Nuclear, Vol. 23/n. 5/maggio, 1976, pp. 271 to 277, discloses the measurement of dynamic unbalance and misalignment of axis of large turbine generators to apply it as an early diagnosis to cope with the troubles. This literature mentions two measuring methods, processing of signals for monitoring and early diagnosis, and relation between the amplitude and the phase caused by the unbalanced rotary members with reference to the rotating speed. Particularly, FIG. 2 of this literature shows a state for mounting the proximity transducers, and FIG. 3 shows a block diagram for processing the signals. According to this literature, the signals from the proximitors are subjected to the signal conversion through a predetermined BP filter. The literature, further, mentions to convert the vibration-phase signals or vibration signals of root mean square values into d-c components to record them.

Thus, according to most of the conventional arts, the vibration signals are smoothed and treated in the form of d-c components. According to such methods for treating the signals, however, a variety of factors are all diagnosed as a whole, making it difficult to effect fine diagnosis.

Further, F. H. Barratt et al., "ACTUS, An Automatically Controlled Turbine Run-up System", AEI Engineering, September/October, 1962, pp. 255-258, discloses a method that is practically applied to the operation for starting turbines.

This literature discusses the apparatus ACTUS that was developed by AEI, and mentions the speed-raising operation of turbines in a paragraph of "Problems of starting large steam turbine" on pages 255 to 256. This literature clearly mentions to raise the speed of the turbines while monitoring the misalignment of axis, vibration and temperature difference between the steam and the metals, which are out of the ordinarily specified ranges, as well as to maintain the speed no matter how fast or slowly the turbines may be running. This, however, is a method of controlling the running speed to a predetermined value under abnormal conditions as mentioned earlier, and is not necessarily advantageous.

In the foregoing were mentioned conventional arts for controlling the operation based on the results of the diagnosis of abnormal conditions, by way of (1) switching the controlling operation into manual controlling operation, (2) maintaining the running speed, and (3) tripping. The signals have been processed by way of smoothing, i.e., signals of average values or d-c signals have been brought into diagnosis.

The signals can be easily processed only if the signals of average values are employed. Thus the diagnosis is not possible unless the signals are converted into those of average values. That is, in case some particular frequency components are increased and other particular frequency components are decreased, the resulting decision will be that the state is not changed unless the average value is changed.

In practice, however, even when the average value is not changed, the increase of some particular frequency components will have to be often regarded seriously. Though the increases of such particular frequency components may not directly be related to the abnormal conditions, we know through experience that it is the beginning of abnormal conditions.

Consequently, when the vibration signals are diagnosed in the form of average values of the whole frequency components, it is difficult to correctly and faithfully diagnose the symptoms. The present invention is based on this fact, and makes it possible to safely control the operation of the turbogenerators, particularly at the time of starting the operation, based on a proper diagnosis which meets the practical demands.

SUMMARY OF THE INVENTION

The principal object of the present invention is to monitor the predetermined vibration frequency components and to diagnose the operating state of rotary members, particularly, the turbogenerators.

It is also an object of the present invention to provide a method of controlling the speed of turbogenerators by monitoring at least one predetermined vibration frequency component in a plurality of predetermined operating speed regions at the time of starting the operation, thereby to diagnose the state of operation.

Another object of the present invention is to so control the operation as to increase the running speed, decrease the running speed or hold the speed, by monitoring particular frequency components to forecast and diagnose the abnormal conditions, particularly at the time of the starting operation.

A feature of the present invention is to diagnose the state of the rotary members by monitoring at least one vibration frequency component having a predetermined relation with respect to the running speed of the turbogenerator, among the detected vibration signals.

Another feature of the present invention is to monitor and diagnose the state of the turbine and generator from correlations among a plurality of frequency components having predetermined relations with respect to the running speed, among the detected vibration signals.

A further feature of the present invention is to control the operation of a rotary member by diagnosing the state of frequency components at the running speed and the state of frequency components having predetermined relations in the vicinities of critical speed regions determined from the specific vibrations of the rotary members existing from the start of the operation to a rated running speed of the rotary members.

Still another feature of the present invention is the control of the operation of a rotary member at the time of starting of the operation by diagnosing the states of the frequency components at a running speed of the rotary member, components of halved harmonics, components of odd harmonics and components of doubled harmonics.

Yet another feature of the present invention is to diagnose the running state of the turbogenerator by analysing the spectrum of all frequency components of the detected vibration signals.

A further feature of the present invention is to perform the operation according to an operation pattern consisting of four regions, i.e., a region of raising the speed, a region of holding the operation, a region in which the speed is dropped below a critical speed closest to the region of holding the operation, and a region of tripping.

BRIEF DESCRIPTION OF THE DRAWINGS

FIG. 5 is a diagram in detail of an A/D converter, an FHT converter and a band average frequency converter;

FIG. 12 comprised of 12(a)–12(d) is a diagram showing examples of signal waveforms at each of the portions of FIG. 11;

Figure 17:
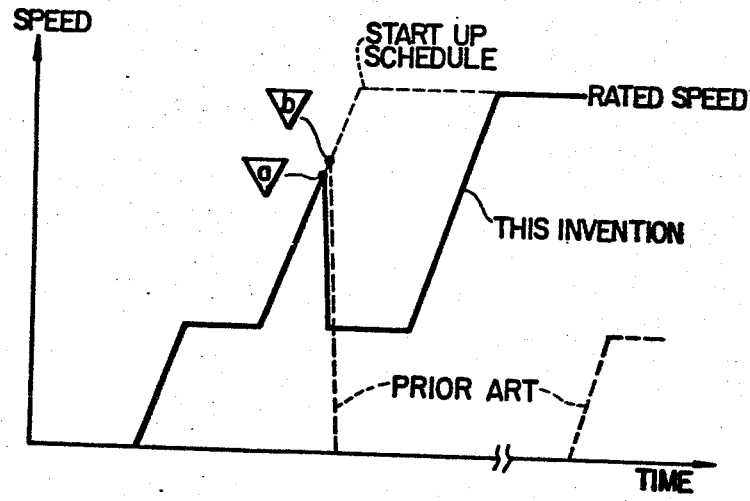
Figure 16D:
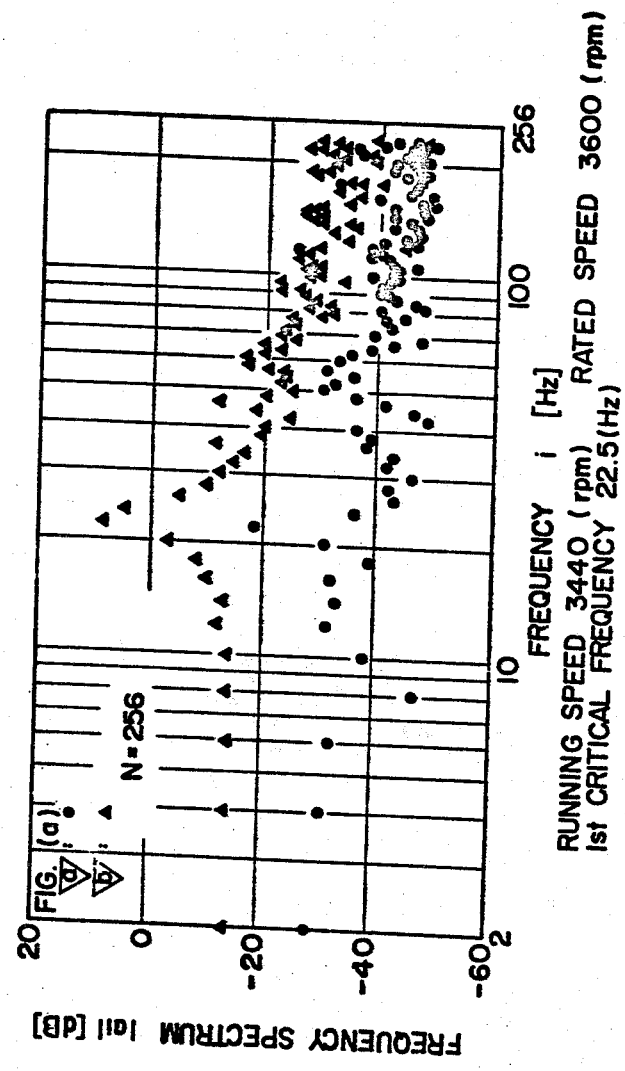

Diagram (a) of FIG. 13 shows a relation between a rotating speed and a vibrating amplitude of a rotary machine, and a sheltered speed region, and diagram (b) shows a relation between a starting schedule and the sheltered speed region;

FIG. 14 is a diagram showing an example of the operation pattern determined by the analyzed frequency components;

Diagrams (A) and (B) of FIG. 15 are flow diagrams for illustrating the frequency analysis of the vibration signals and the method of controlling the operation, and diagrams (C), (D) and (E) show examples of the operation pattern;

Diagram (a) of FIG. 16 shows an example of the vibrating amplitude by the oil whirl and rubbing with respect to the rotating speed, diagram (b) shows an example of vibration signals at point $\boxed{a}$ in the diagram (a), diagram (c) shows an example of vibration signals at a point $\boxed{b}$ caused by the oil whirl, and diagram (d) shows spectra of frequency at point $\boxed{a}$ and $\boxed{b}$ in diagram (a); and FIG. 17 is a diagram showing the starting characteristics of the present invention in comparison with the conventional art.

DESCRIPTION OF THE PREFERRED EMBODIMENTS

Briefly, the fundamental items for the diagnosis of abnormal conditions by analyzing frequency components as contemplated by the present invention will be discussed.

In regard to large rotary machines, especially in regard to turbogenerators which are constructed in large capacities in recent years, it is very important to diagnose the abnormal conditions at an early stage and to take the necessary correctional measures. The problem here will deal with signals from which the abnormal conditions may be diagnosed. Below is briefly mentioned the method of analyzing the vibration signals from the detectors mounted on the bearings.

Figure 1:
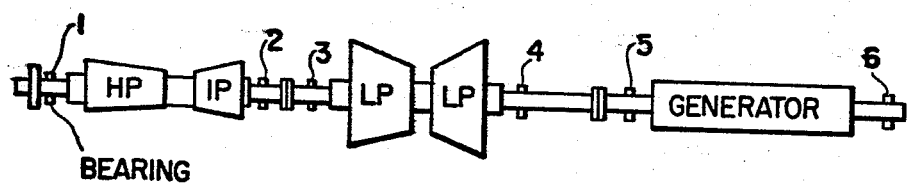
FIG. 1 is a sketch showing a state in which large turbogenerators are coupled together.

FIG. 1 shows an example of a large turbogenerator consisting of a high-pressure turbine HP, an intermediate-pressure turbine IP, a low-pressure turbine LP, and a generator that are directly coupled together. Reference numerals 1 to 6 represent bearings on which are usually mounted vibration detectors.

Figure 2:
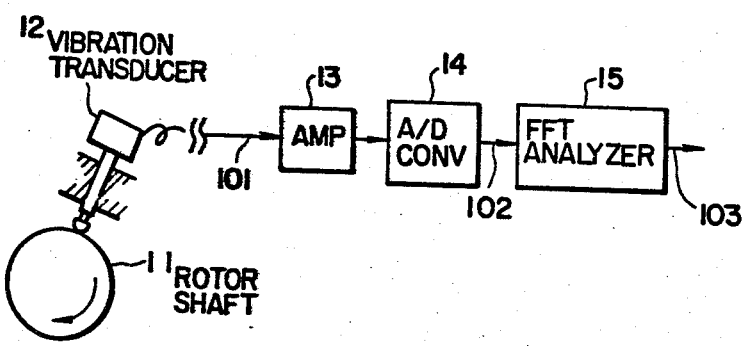
FIG. 2 is a block diagram showing a state for mounting a vibration amplitude detector on a bearing and for processing the signals.

FIG. 2 shows an example in which a vibration detector is mounted, wherein reference numeral 11 denotes a rotary member (shaft), 12 a vibration detector (transducer), 13 a sample-holding circuit, 14 an analog-to-digital converter (A/D converter), and reference numeral 15 denotes an FFT (Fast Fourier Transformer). Among the signal lines, reference numeral 101 represents a vibration amplitude analog signal, 102 a vibration amplitude digital signal, and reference numeral 103 denotes a spectrum signal of the whole of the vibration frequencies. Although FIG. 2 shows a vibration detector of a contacting type, the vibration detector may of course be of a non-contacting type provided it detects the vibration of the machine.

FIG. 2 shows the case of employing an FFT which is suited for the diagnosis of abnormal conditions of a rotary machine where a plurality of factors are correlated in a complicated manner. The reason is because, the features in most cases can be easily extracted if the time series signals are transformed into frequency regions. In recent years therefore it has been attempted to utilize a high-speed Fourier transform in on-line system in performing factory test, installation adjustment or when trouble develops. For example, Japanese Patent Laid-Open No. 1411/72 entitled "Apparatus for processing data by high-speed Fuorier Transform" (filed by IBM on July 6, 1970, corresponding U.S. patent application Ser. No. 52,332) discloses to make a hardware for a variety of high-speed Fourier transformation algorithm for calculating isolated Fourier transforms, among many methods for numerically solving problems utilizing isolated Fourier transformations. Although the disclosure of this Laid-Open publication has no relation to the diagnosis of abnormal conditions of rotary machine, there is a discussion mentioned concerning the use of an FFT. Reference should be made to the above publication for the details of the FFT. A brief discussion of the FFT follows.

As is well known, an isolated Fourier transformation of equation (1) is operated at a high speed by way of row substitution of a Fourier matrix F and Good's formula for the resolution into factors.

Here, the Fourier coefficient a is $$a = (1/N) \cdot F \cdot X \tag{1}$$

where, N represents a number of samples, F Fourier matrix, and X a time series signal. They can further be given by the equations (2) and (3)

$$a^T = [a_0, a_1, a_2, \ldots a_{N-1}] \tag{2}$$

$$F_{i,j} = W^{i,j} \triangle W^i$$

$$W = \exp(-j2\pi/N) \tag{3}$$

$\Delta W = \exp(j\pi/N)$ where T represents transposition, i a frequency or harmonic frequency, and i, $l = 0, 1, 2, 3, -(N-1)$.

The time series signal $X^T$ is given by $$X^T = [X_0, X_1, X_2, X_3, \ldots X_{N-1}] \tag{4}$$

which is a time series signal of a vibrating waveform.

A symbol $\Delta W$ represents a phase-correcting operator for performing the analysis at a central point in the sampling point.

$$F = \begin{bmatrix} F_0 \\ \vdots \\ F_i \\ \vdots \\ F_{N-1} \end{bmatrix} = \begin{bmatrix} W^0 & W^0 & W^0 \cdots W^0 \\ W^0 \cdot \Delta W & W \cdot \Delta W & W^2 \cdot \Delta W & W^{N-1} \cdot \Delta W \\ W^0 \cdot \Delta W^i & & W^{i} \Delta W^i \\ W^0 \cdot \Delta W^{(N-1)} & \cdots & W^{(N-1)2} \cdot \Delta W^{(N-1)} \end{bmatrix} \tag{5}$$

The FFT transformer is now finding widespread applications as it makes it possible to easily find the spectrum of all frequencies of time series signals. However, in diagnosing the turbines and generators in on-line systems, it is necessary to keep the monitoring at all times irrespective of whether the operation is under normal or abnormal conditions. To cope with the emergency, the results of analysis must be directly connected to the analysis of factors under abnormal conditions.

That is, to employ the FFT algorithm of the conventional art for diagnosing abnormal conditions while monitoring at all times, provides the advantage that the spectrum of all frequencies of the time series signals can be easily found as mentioned in the foregoing, but presents the below-mentioned defects.

The first defect is that the multiplication of $W(=\exp(-j2\pi/N))$ of the equation (3) must be performed $(\frac{1}{2}N)\cdot\log_2 N$ times, (here N represents the number of samples), which is a too great burden for calculating using a control computer in real time.

The second defect is that although the spectrum of all frequencies can be obtained, the operating staffs still must determine and analyze the factors from the distributed contents, which is not desirable in emergency cases.

As for the first defect, the calculating speed can be advantageously heightened using an FFT composed of the exclusively designed hardwares. This, however, requires increased manufacturing cost as compared with the case of softwares. The utility value, however, may increase provided the hardware can be cheaply manufactured.

There is also a method of analysing the frequencies (or correctly, analysing the sequency) by utilizing the Fast Hadamard Transformer (hereinafter referred to as FHT) which analyses the time series input signals with rectangular waves as reference waves. The FHT is also called a Walsh-Hadamard Transformer (abbreviated as WHT). In regard to this method of frequency analysis, reference should be made, for example, to "BIFORE OR Hadamard Transform" by Nasir Ahmed et al (IEEE Transaction on Audio and Electroacoustics, September 1971, pp. 225 to 234).

Figure 3:
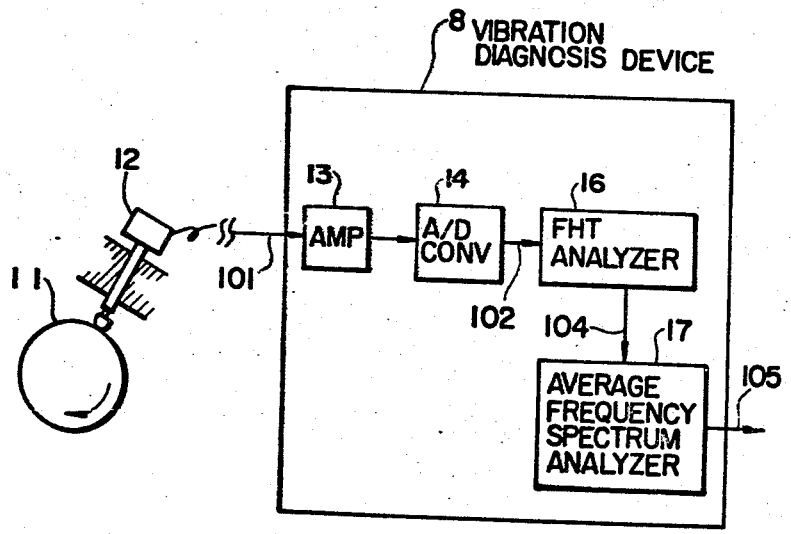
FIG. 3 is a block diagram showing a method of analysing the vibration signals by FHT.

FIG. 3 is a block diagram employing the FHT. An FHT analyzer is denoted by reference numeral 16 and a band average frequency analyzer is denoted by 17.

An input signal consists of a signal 104 having a sequency coefficient A obtained by FHT-transforming the time series digital signals, and a band frequency spectrum signal is found based on a linear transform coefficient K which has been specified beforehand, or a band average frequency spectrum signal 105 is obtained based on an average linear transform coefficient $\overline{K}\cdot K$ and $\overline{K}$ will be mentioned later in detail.

Below is briefly mentioned the FHT.

The FHT system which processes the time series input signals, produces a sequency coefficient A which is defined as follows:

$$A = N^{-1} \cdot T \cdot [G_1] \cdot [G_2] \cdots [G_n] \cdot X \tag{6}$$

where $n = \log_2 N$ sequency coefficient: $A^T = [A_0, A_1, A_2, \ldots A_{N-1}]$, where T is transposition, substituted matrix: T $$[G_i] = E^{(i-1)} \otimes H^{(1)} \otimes E^{(n-i)}$$

where $\otimes$ denotes a Kronecker product.

diagonal matrix: $E^{(0)} = 1$

Hadamard matrix: $H^{(1)} = \begin{bmatrix} 1 & 1 \\ 1 & -1 \end{bmatrix}$

Here, the Walsh and Fourier Transfer (hereinafter referred to as WFT) is a method for transforming the sequency coefficient A into a Fourier coefficient a in accordance with the equation (7).

$$a = K \cdot A \tag{7}$$

Here, the linear transform coefficient K is given by the equation (8).

$$K = (1/N) \cdot F \cdot H \tag{8}$$

As will be obvious from the equation (6), only the addition and the subtraction need be carried out. Therefore, as compared with the FFT which performs the multiplication of complex numbers such as of sine and cosine, the above method is capable of processing the calculation needing one-tenth or less of the operation time. This is particularly desirable when the abnormal conditions of the rotary machines are to be diagnosed in an on-line system. For instance, this method proves to be particularly preferable in diagnosing the turbines at the time of starting the operation.

Symbols F and H represent Fourier matrix and Hadamard matrix of the Nth order. Namely, according to the FHT system, the sequency coefficient output A can be transformed into a Fourier coefficient for indicating the frequency components by utilizing a linear transform coefficient K.

Based on these fundamental items, the present invention is mentioned below with reference to embodiments.

First, below are mentioned the analysis of the detected vibration signals and the diagnosis of abnormal conditions.

The present invention is based on the use of the aforementioned FHT. The present invention, however, is not to find the coefficient a of all frequencies for materializing the high speed, but is to find any given band average frequency $\overline{a}$ in accordance with the equation (9).

$$\bar{a}_p = \bar{K}_p A \qquad (8)$$

Here, the average linear transform coefficient is, $$\bar{K}_p = [\bar{k}_{p,0}, \bar{k}_{p,1} ---, \bar{k}_{p,j} ---, \bar{k}_{p,N-1}] \qquad (9)$$

$$\bar{k}_{p,j} = \frac{1}{m_p} \sum_{q=0}^{N-1} k_{q,j}$$

$$\begin{cases} q \in i \\ i, j = 0, 1, 2, ---, N-1 \end{cases}$$

average linear transform coefficients $\bar{K}_p$ which we empirically selected to cope with abnormal vibration of the rotary machines.

TABLE 1

| P | Cause of vibration | Reference for selecting $K_p$ | Example of $K_p$ selected |
|---|---|---|---|
| 1 | Misalignment of bearings | Fractional harmonic vibration (even order ½R) | i = 29, 30, 31, 14, 15, 16 ($m_1 = 6$) |
| 2 | Loosened couplings | Fractional harmonic vibration (odd order ½R) | i = 19, 20, 21, 11, 12, 13 ($m_2 = 6$) |
| 3 | Self-exicited vibration caused by oil-film characteristics in the bearings | Critical speed (Rc) | i = 21, 22, 23 ($m_3 = 3$) |
| 4 | Thermal bending caused by rubbing | Rotating speed (R) | i = 59, 60, 61 ($m_4 = 3$) |
| 5 | Unbalance in rigidity | Doubled harmonics vibration (2R) | i = 119, 120, 121 ($m_5 = 3$) |

Note:
R represents components of running speed, and Rc represents specific frequency.

Table 1 shows the examples of the average linear transform coefficients $\bar{K}_p$ of the turbines and generators which revolve at high speeds in thermal or nuclear power stations. The causes of abnormal vibration are roughly divided into five: (1) misalignment of bearings, (2) loosened couplings, (3) self-excited vibration caused by the oil-film characteristics in the bearings, (4) thermal bending caused by rubbing, and (5) unbalance in rigidity. Analysis of the frequencies of vibrations caused by these factors indicates that the vibrations have their specific frequency regions. Namely, it has been found that the frequency components (spectra) develop in the form of fractional harmonics vibration and doubled harmonics vibrations depending upon the causes. Consequently, if the frequency components are found depending upon the fractional harmonics components and doubled harmonics, it is allowed to know the degree of causes.

Table 1 shows relations among such causes. It was already mentioned that the FHT is capable of greatly reducing the processing time as compared with the conventional FFT. This is because, the step of multiplication which occupies a great proportion of operation of the FFT, is almost eliminated in the processing step of FHT.

Figure 4:
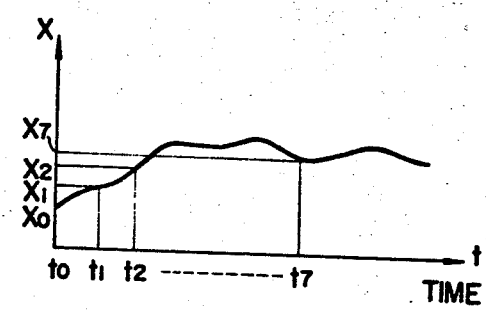
FIG. 4 is a diagram showing vibrating amplitude characteristics, the abscissa representing the time t, and the ordinate representing the vibrating amplitude x.

Below is concretely illustrated the relation between the FHT analyzer 16 and the band average frequency analyzer 17. FIG. 4 is a diagram showing vibration amplitude characteristics of an event, in which the abacessa represents the time t and the ordinate represents the vibration amplitude X. FIG. 4 deals with eight samples $X_0, X_1, -X_7$ with respect to eight sampling times $t_0, t_1, -t_7$. The vibration amplitudes of eight samples are taken in through the sample-holding circuit 13 and are converted into digital signals through the A/D converter 14. FIG. 5 is a diagram showing relations in detail among the A/D converter 14, the FHT analyzer 16 and the band average frequency analyzer 17. The band average frequency analyzer 17 consists of a linear converter 70, a memory 71, multipliers M and adders add.

Figure 6:
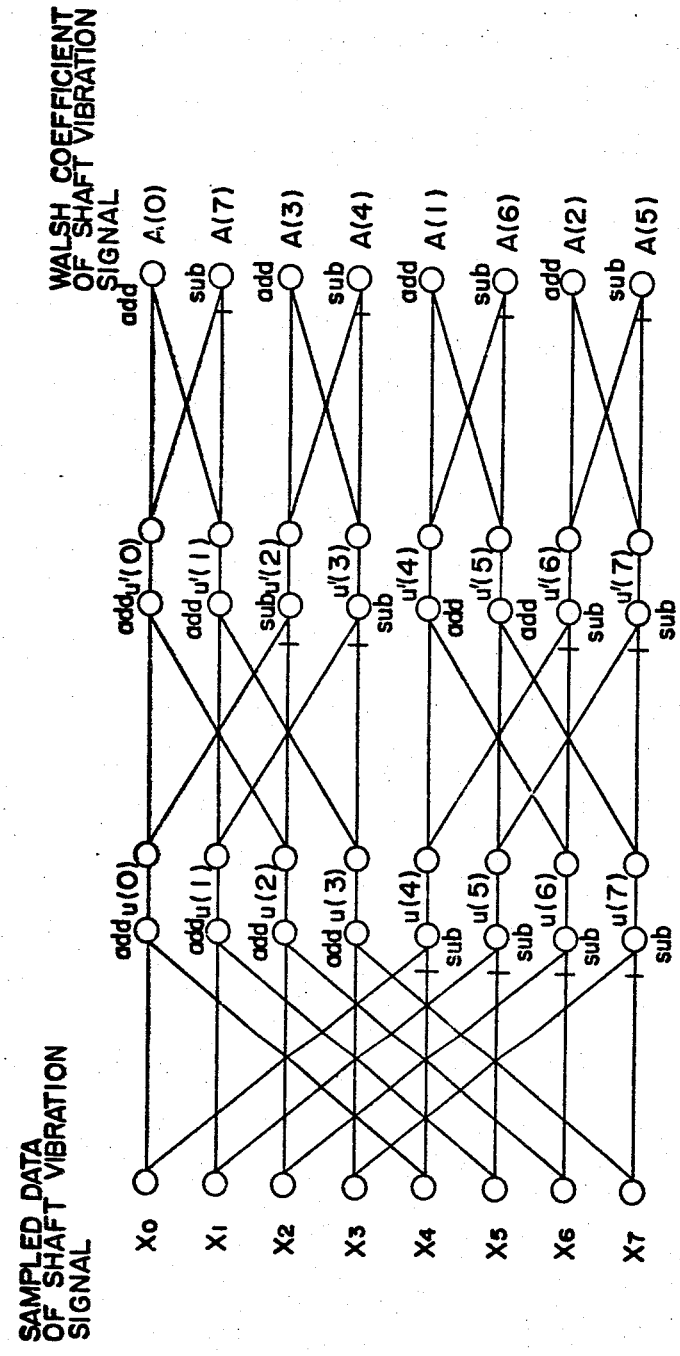
FIG. 6 is a flow diagram showing in detail the arithmetic operation by the FHT converter.

In FIG. 5, symbol add designates an adder, and sub a subtractor. Symbol + of the subtractors means that a signal of the signal line is subtracted. Symbol ⊠ designated at M represents a multiplier. FIG. 6 shows detailed construction of the FHT analyzer 16. The vibration amplitude X subjected to the analog-to-digital conversion is stored in a memory (not shown), and then the operation of an element u is performed. The operation of the element u is carried out in accordance with the following equation (10).

$$\begin{aligned} u(0) &= X_0 + X_4 \\ u(1) &= X_1 + X_5 \\ u(2) &= X_2 + X_6 \\ &\vdots \\ u(6) &= X_2 - X_6 \\ u(7) &= X_3 - X_7 \end{aligned} \qquad (10)$$

Based on u found according to the equation (10), the element u' is then operated. The operation of the element u' is carried out in accordance with the following equation (11).

$$\begin{aligned} u'(0) &= u(0) + u(2) \\ u'(1) &= u(1) - u(3) \\ &\vdots \\ u'(6) &= u(4) - u(6) \\ u'(7) &= u(5) - u(7) \end{aligned} \qquad (11)$$

By repeating the abovementioned operations n times ($n = \log_2 N$, where N is a number of the samples), the sequency coefficients $A(0), A(1), -A(7)$ (general formula, $A(k)$) can be found. In FIG. 6, symbol add represents adders and sub subtractors.

Transform coefficients are utilized to transform the outputs $A(0), A(1), -A(7)$ of the FHT analyzer 16 of FIG. 6 into Fourier coefficients $a_0, a_1, b_1, -b_4$. Examples of the transform coefficients are shown in Table 2.

TABLE 2

| | $a_0$ | $a_1$ | $a_2$ | $a_3$ | $a_4$ |
|---|---|---|---|---|---|
| $A_0$ | 1.0 | | | | |
| $A_2$ | | 1.306563 | | −0.541197 | |
| $A_4$ | | | 1.414213 | | |
| $A_6$ | | 0.541196 | | 1.306562 | |

| | $b_0$ | $b_1$ | $b_2$ | $b_3$ | $b_4$ |
|---|---|---|---|---|---|
| $A_1$ | | 1.306563 | | 0.541197 | |
| $A_3$ | | | 1.414215 | | |
| $A_5$ | | −0.541195 | | 1.306563 | |
| $A_7$ | | | | | 1.0 |

The following equation (12) can be obtained if Fourier coefficients a, b are found using the above transform coefficients.

$$\begin{bmatrix} a_0 \\ b_1 \\ a_1 \\ b_2 \\ a_2 \\ b_3 \\ a_3 \\ b_4 \end{bmatrix} = \begin{bmatrix} A_0 \\ 1.306563\, A_1 - 0.541195\, A_5 \\ 1.306563\, A_2 + 0.541195\, A_6 \\ 1.414215\, A_3 \\ 1.414213\, A_4 \\ 0.541197\, A_1 + 1.306563\, A_5 \\ -0.541197\, A_2 + 1.306563\, A_6 \\ A_7 \end{bmatrix} \quad (12)$$

In the equation (12), symbol $a_0$ represents a d-c component, symbols $a_1$, $a_2$, $a_3$ and $a_4$ represent sine wave components, and $b_1$, $b_2$, $b_3$ and $b_4$ denote cosine wave components. Referring to Table 2 again, the values remain practically the same even if numerical figures smaller than the fifth decimal point are rounded off. As a result, the transform coefficients employed for the equation (12) are the following five values: 1.3066, 0.5412, 1.4142, and 1.3066. Therefore, the above five transform coefficients are stored, and the Fourier coefficients a and b are found by utilizing the equation (12). According to the present invention made up of a combination of the conventional FHT and the linear transform, the individual Fourier coefficients are not found from the sequency coefficients in accordance with the equation (12), but the Fourier coefficients are found as average values of frequency bands. An embodiment of the present invention therefore is mentioned below with reference to FIG. 5 again.

D-c components, average value of since waves and average value of cosine waves are considered below as frequency bands. Since the transform coefficient is 1, the d-c component $a_0$ is, $$a_0 = A(0) \quad (13)$$

as will be obvious from the foregoing description. The average value $\bar{a}$ of the sine waves is, $$\bar{a} = a_1 + a_2 + a_3 + a_4 \quad (14)$$
$$= 0.7654\, A(2) + 1.4142\, A(4) + 1.8478\, A(6)$$

The average value $\bar{b}$ of the cosine waves is, $$\bar{b} = b_1 + b_2 + b_3 + b_4 \quad (15)$$
$$= 1.8478\, A(1) + 1.4142\, A(3) + 0.7654\, A(5) + A(7)$$

where, $$1.8478 = 1.3066 + 0.5412$$
$$0.7654 = 1.3066 + 0.5412 \quad (16)$$
$$1.4142 = 1.4142$$

To the equations (14) and (15), only the following three data are needed; i.e., 1.8478, 0.7654, and 1.4142. The above three data serve as transform coefficients for the band averages.

In the band average frequency converter 17 of FIG. 5 the above three data are stored in the memory 71. In the linear converter 70, the multiplication is carried out between the data of the memory 71 and the sequency, followed by the addition, and then the operations are performed according to equations (14) and (15) to find the average values $\bar{a}$ and $\bar{b}$. According to the abovementioned embodiment, the average frequency spectrum can be detected which requires a small memory capacity.

Although the abovementioned average values are related to the sine and cosine components, the same holds true for the average values of various harmonics components. As the number of samples N increase, the band averages can be found maintaining higher precision. In general, the numbers N=256, 512, 1024,—can be practically employed.

The general formula (when the number of samples is N) for transforming the sequency coefficient A into a Fourier coefficient a which indicates the frequency components, is given by the following equation (17)

$$\begin{bmatrix} a_0 \\ b_1 \\ a_1 \\ b_2 \\ a_2 \\ \vdots \\ b_{\frac{1}{2}R} \\ a_{\frac{1}{2}R} \\ \vdots \\ b_{\frac{1}{4}R} \\ a_{\frac{1}{4}R} \\ \vdots \\ b_{Rc} \\ a_{Rc} \\ \vdots \\ b_R \\ a_R \\ \vdots \\ b_{2R} \\ a_{2R} \\ \vdots \\ b_{\frac{N}{2}-1} \\ a_{\frac{N}{2}-1} \\ b_{\frac{N}{2}} \end{bmatrix} = \begin{bmatrix} C^a_{0,0} & \cdots & C^a_{0,N-1} \\ & \vdots & \\ C^b_{\frac{1}{2}R,0} & \cdots & C^b_{\frac{1}{2}R,N-1} \\ C^a_{\frac{1}{2}R,0} & \cdots & C^a_{\frac{1}{2}R,N-1} \\ C^b_{\frac{1}{4}R,0} & \cdots & C^b_{\frac{1}{4}R,N-1} \\ C^a_{\frac{1}{4}R,0} & \cdots & C^a_{\frac{1}{4}R,N-1} \\ C^b_{Rc,0} & \cdots & C^b_{Rc,N-1} \\ C^a_{Rc,0} & \cdots & C^a_{Rc,N-1} \\ C^b_{R,0} & \cdots & C^a_{R,0} \\ C^a_{R,0} & \cdots & C^a_{R,0} \\ C^b_{2R,0} & \cdots & C^b_{2R,0} \\ C^a_{2R,0} & \cdots & C^a_{2R,0} \\ & \vdots & \\ C^b_{\frac{N}{2},0} & \cdots & C^b_{\frac{N}{2},0} \end{bmatrix} \begin{bmatrix} A_0 \\ A_1 \\ A_2 \\ \vdots \\ A_{N-1} \end{bmatrix} \quad (17)$$

where R represents the components of running speed, and Rc a specific frequency.

Further, in order to convert the coefficient into a frequency spectrum, the operation is carried out according to the equation (18).

$$|a_i| = 20\, \log_{10} \sqrt{b_i^2 + a_i^2} \quad (18)$$

For example, a halved running speed $P_{\frac{1}{2}R}$ is given by $$|a_{\frac{1}{2}R}| = 20\, \log_{10} \sqrt{b_{\frac{1}{2}R}^2 + a_{\frac{1}{2}R}^2} \quad (19)$$

According to the aforementioned embodiment, the frequency characteristics can be found in the form of a band with respect to the causes of vibration shown in Table 1. It is therefore allowed to properly grasp the causes of vibration and take a necessary measure.

Figure 7:
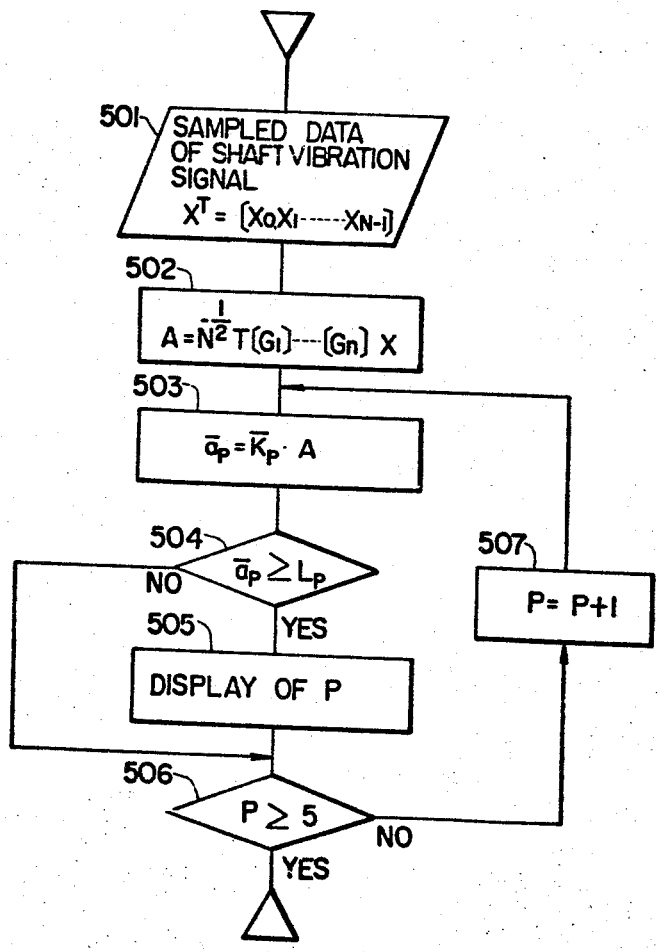
FIG. 7 is a flow diagram showing the case when the arithmetic operation by the FHT converter of FIG. 6 and a linear conversion are carried out by a digital computer.

The object of the present invention can also be accomplished by using a computer. FIG. 7 shows a flow chart for this purpose. First, the timeseries signals $X^T = [X_0, X_2, \ldots X_{N-1}]$ are introduced through a flow 501. Then, a sequency coefficient A is found in accordance with $$A = N_1^T[G_1] \quad [G_n] \cdot X$$

in a flow 502. Based on an average transform coefficient $\overline{K}$, the band average Fourier coefficient $\overline{a}_p = K_p \cdot A$ is found. This processing is the same as the processing of the aforementioned embodiment. Checking is then effected. That is, whether the band Fourier coefficient $\overline{a}$ in a flow 504 is within an allowable value $L_p$ (abnormality discrimination level) is checked. When the requirement has been satisfied, the operation is shifted to a flow 506 where the checking is effected as to whether all of the samples have been scanned. When the scanning has been completed, the operation is shifted to a flow 507. When all of the procedures have been completed, the operation is ready for the next samples. When the flow 504 has not been satisfied, the state at that moment is indicated by means of the flow 505. The checking in the abovementioned steps can also be applied to the case of FIG. 5.

Figure 8:
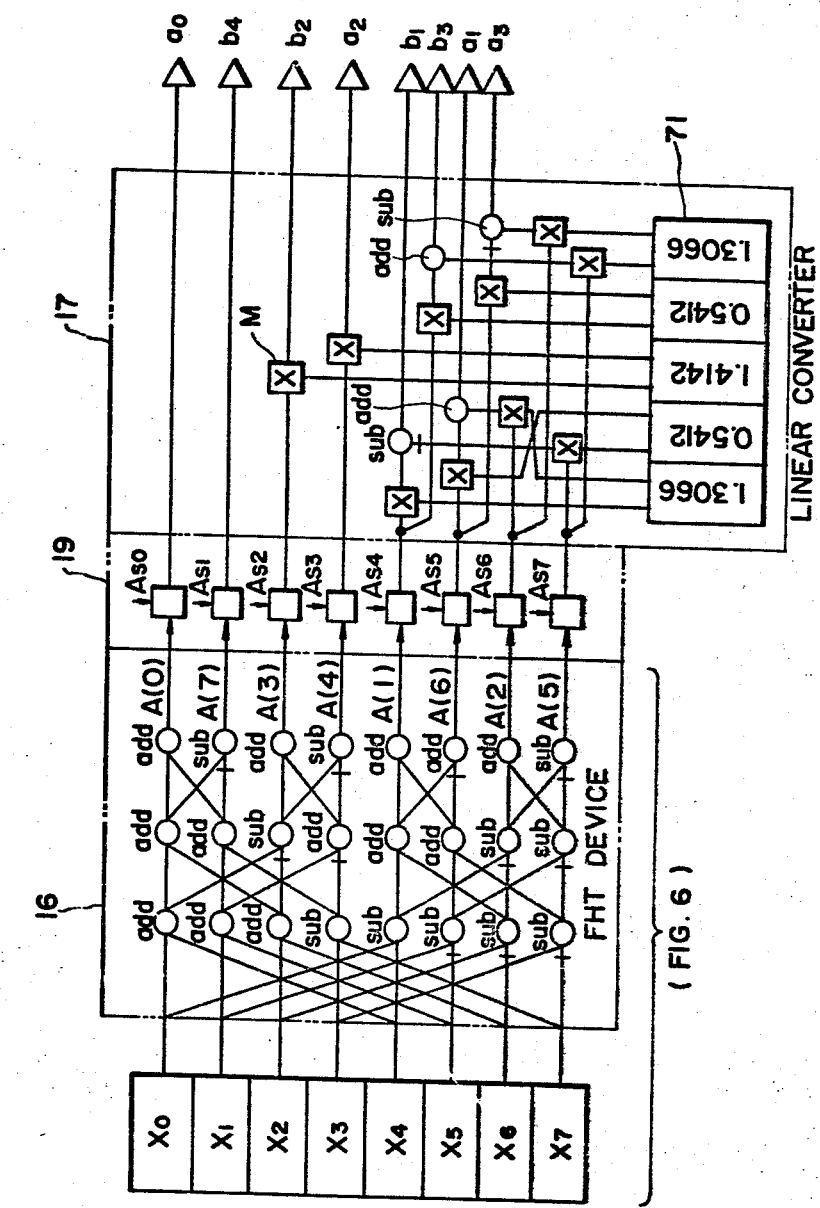
FIG. 8 is a flow diagram of arithmetic operation when the FHT arithmetic operation of FIG. 6 and the linear conversion are combined together.

Below is mentioned another embodiment of the present invention. FIG. 8 shows the embodiment in which the aforementioned conventional FHT and the linear transform are combined together. Therefore, the converter section 17 has been so constructed as to perform the operation of equation (12). The greatest feature of this embodiment is the provision of a comparator section 19 between the analyzer 16 and the analyzer 17. The comparator section 19 has comparators of a number corresponding to the number of sequency coefficients. The individual comparators introduce the corresponding sequency coefficients and allowable values As which have been preset for each of the sequency coefficients, and compare the two. The allowable value As of the sequency coefficient serves as a reference value by which it can be so determined that the values in excess of the reference value As are indicative of the abnormal conditions. The comparators ($As_0$ to $As_7$ in this case) compare the sequency coefficients Ak with reference to the allowable values Ask. The comparators do not produce the output when the difference from the allowable values is smaller than a predetermined width Mp, and produce the sequency coefficient Ak when the difference is greater than the width Mp to indicate that the machine is under abnormal conditions. By utilizing the sequency coefficient determined as indicative of the abnormal conditions, the analyzer 17 finds a related Fourier coefficient. Based on the results of the Fourier coefficient, the checking is effected again as to whether the machines are under normal or abnormal conditions. Namely, in the aforementioned embodiment, the primary abnormality checking is effected in regard to the sequency coefficient. When it is checked that the machines are under abnormal conditions, a Fourier coefficient is found to effect the secondary abnormality checking. In case only one sequency coefficient is determined to be defective, it becomes necessary to calculate other sequency coefficients (except $a_0$) to find a Fourier coefficient. It is therefore necesssary to find the Fourier coefficient by taking the above sequency coefficients into consideration. Although not diagramed, the results of the individual comparators are checked by a control circuit as to whether or not the comparators should produce the outputs.

Figure 9:
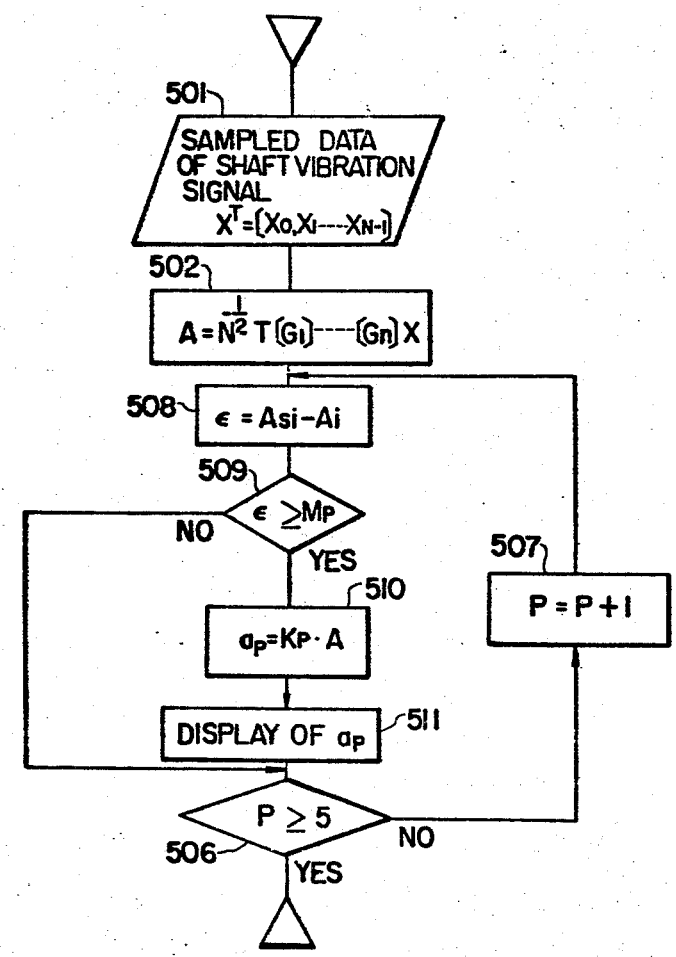
FIG. 9 is a flow diagram of arithmetic operation when the operation of FIG. 8 is carried out by means of a digital computer.

FIG. 9 is a flow chart of the present invention when it is constructed by the use of a computer. The deviation between the allowable value Ask and each of the sequency coefficients Ak is found in a block 508. Then the checking is effected in a block 509 as to whether the deviation $\epsilon$ is smaller than the value Mp. When the deviation is smaller than Mp, the operation is shifted to a block 506, and when the deviation is greater than Mp, the operation is shifted to a block 510 to find a Fourier coefficient. The display is then made by a block 511. These embodiments can also be applied to the case of band average. In this case, also, the comparator section 19 is provided between the analyzer 16 and the analyzer 17.

In the foregoing was mentioned mainly in regard to the processing of the detected vibration signals. Below is mentioned the control of operation of a turbine and a generator based on the diagnosed results of these processed signals.

Figure 10:
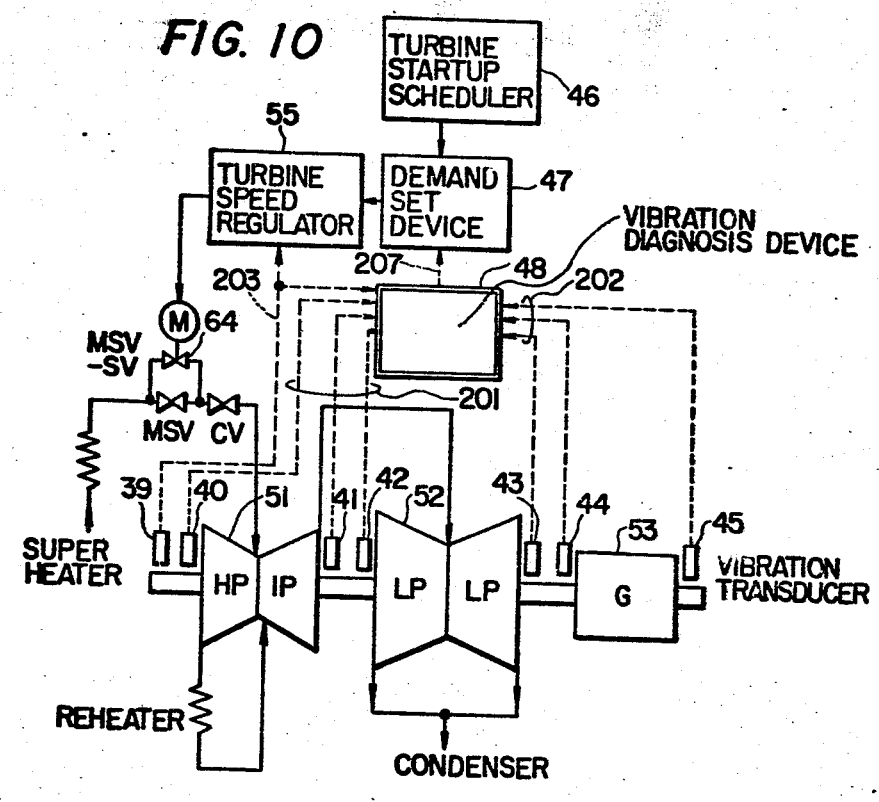
FIG. 10 is a block diagram when the speed of the turbine is practically controlled by diagnosing the vibration.

FIG. 10 is a block diagram showing the whole setup, in which a high-pressure turbine HP designated at 51, an intermediate-pressure turbine IP, a low-pressure turbine LP designated at 52, and a generator G designated at 53 are directly coupled together. Reference numeral 39 denotes a running speed detector, and reference numerals 40 to 45 denote vibration amplitude detectors mounted on the bearings. Reference numeral 48 represents a vibration diagnosing device which diagnoses the rotary machines based on the vibration amplitude signals, 47 a demand set device which corrects the schedule signals from a turbine start-up scheduler 46 for controlling the speed relying upon the results of diagnosis of the vibration signals (signals detected by the detectors 40 to 45) from rotary members, and reference numeral 55 designates a turbine speed regulator which controls the speed of the turbine responsive to the signals set by the demand set device 47. Symbol Ⓜ represents a motor for operating a valve MSV-SV 64, MSV-SV a supplemental valve of a main stop valve, MSV a main stop valve, and CV a control valve.

The turbine speed regulator controls a main steam-blocking by-pass valve 64 responsive to the deviation between a signal 203 from the running speed detector 39 and a signal from the demand set device 47, and controls the flow rate of the steam to the turbine 51 such that a desired running speed is attained. Although it was mentioned that the signals from the turbine start-up scheduler are corrected relying upon the diagnosed results, it may otherwise be menticned in a way that the signals are set prior to the schedule signals to control the speed of the turbine.

Figure 11:
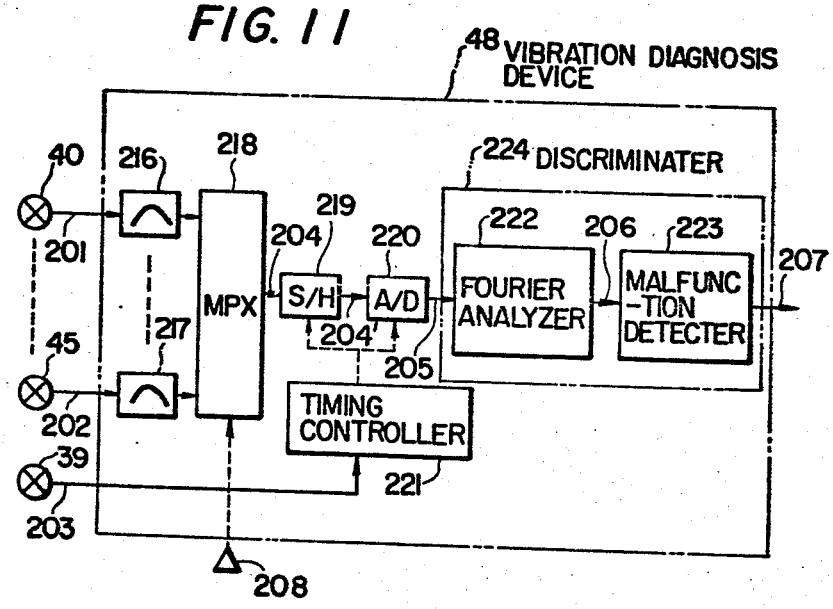
FIG. 11 is a block diagram which is a more concrete representation of the apparatus for diagnosing the vibration of FIG. 10.
Figure 15A:
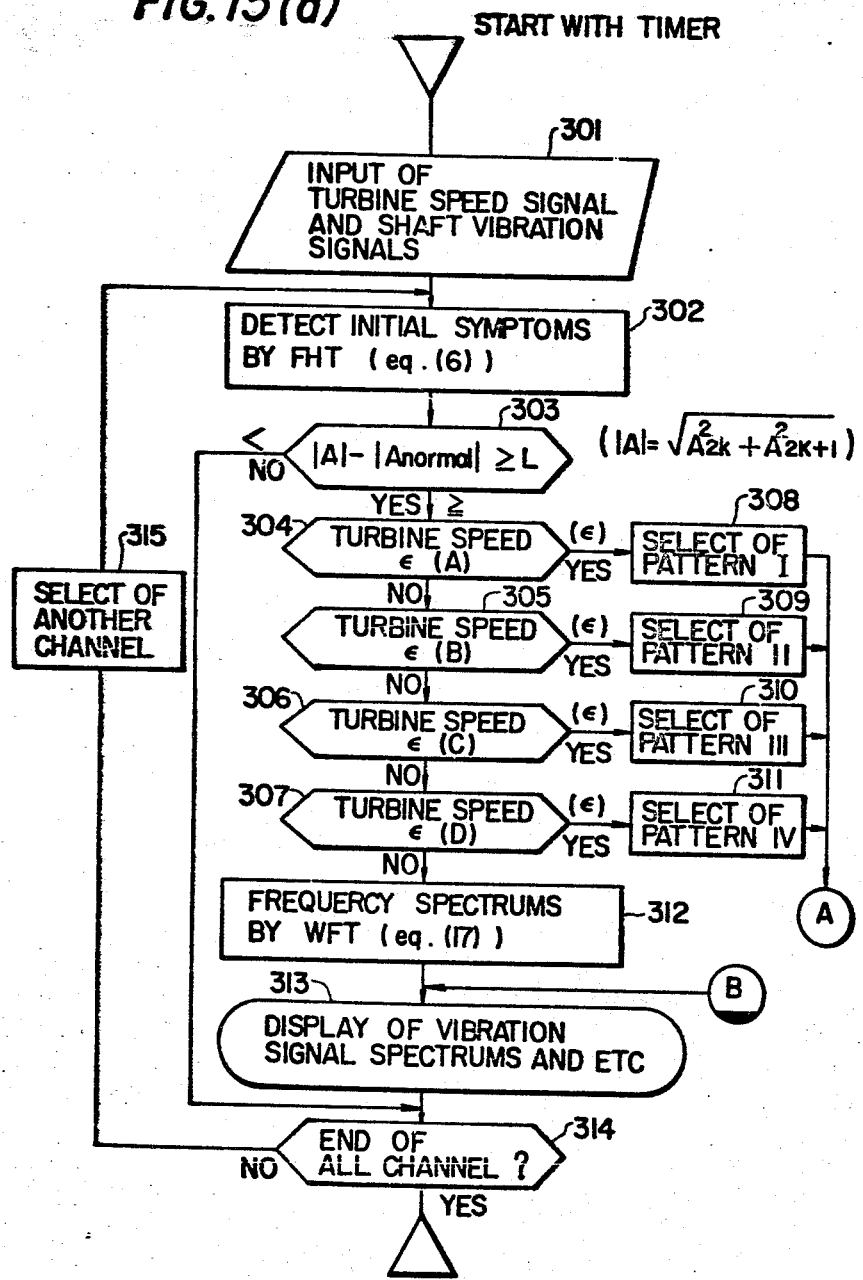
Figure 15B:
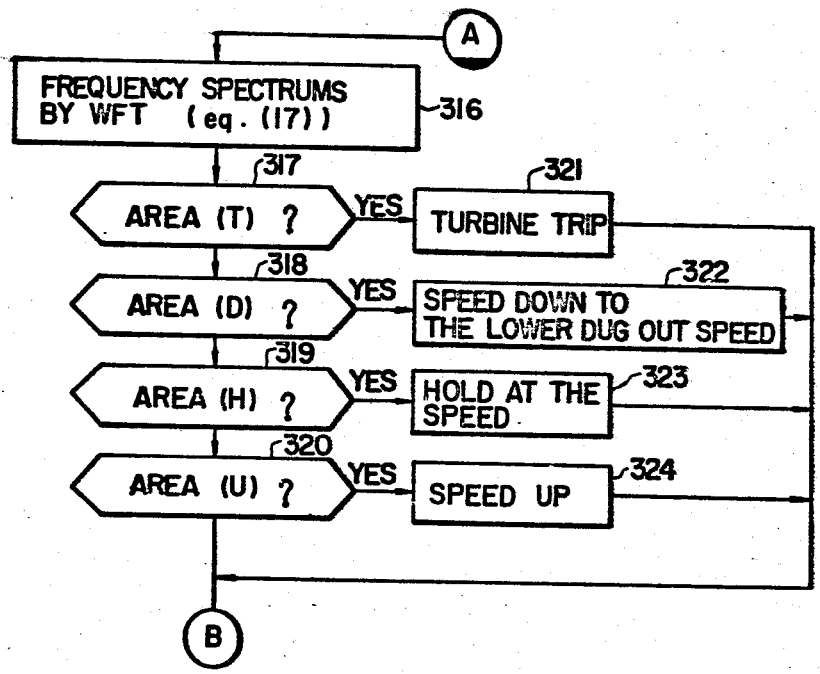
Figure 15C:
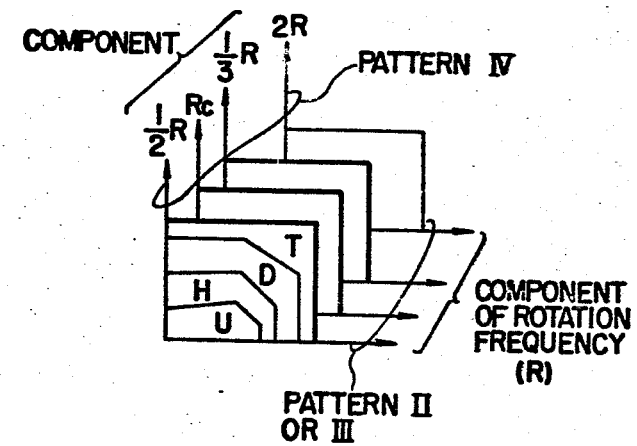
Figure 15D:
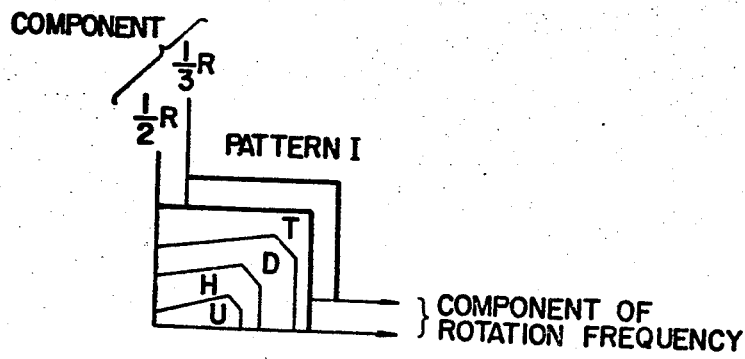
Figure 15E:
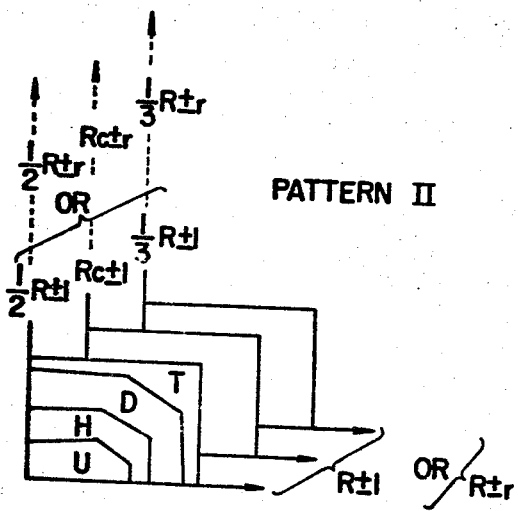
Figure 16A:
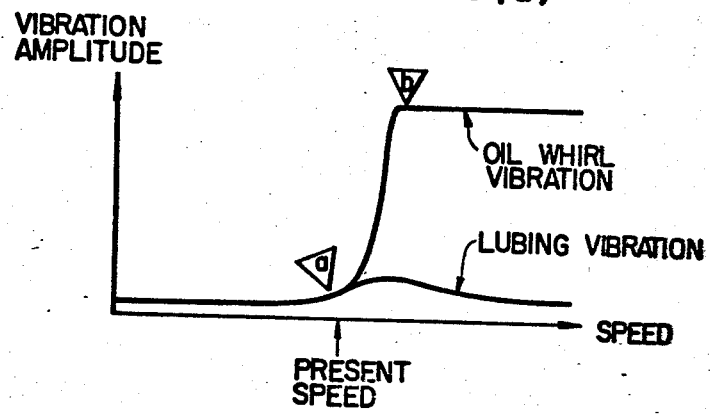
Figure 16B:
Figure 16C:
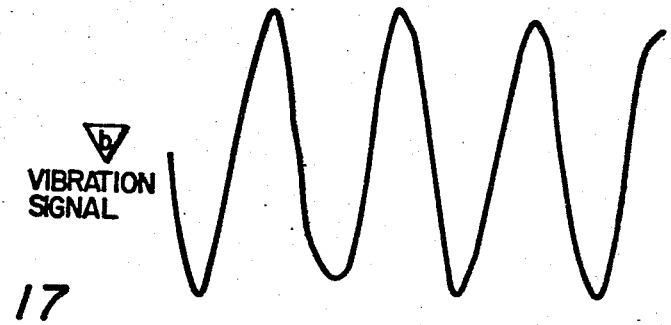

FIG. 11 is a diagram showing a concrete setup of a vibration diagnosing device 48, in which reference numerals 216 and 217 denote band filters, 218 a multiplexer, 219 a sample holder, 220 an A/D converter, 221 a timing generator circuit which generates the timing is synchronism with the running speed, 222 a Fourier transformer, 223 a discriminator for discriminating the state of a rotary member based on the Fourier-transformed signals, and a diagnosis device 224 is made up of the Fourier transformer 222 and the discriminator 223.

Reference numeral 204 represents an analog signal of shaft vibration, 205 a digital signal of shaft vibration, 206 a harmonics spectrum signal, and reference numeral 207 denotes a demand set signal based on the analysed results which will be fed to the demand set device 47. A signal source 208 works to switch the multiplexer. That is, the multiplexer is switched by the signals of the signal source 208, so that a plurality of vibration detecting signals are successively switched and introduced.

FIG. 12 shows an example of a waveform, in which diagram (a) shows the waveform of a shaft vibration signal detected by the vibration detector, for example, the waveform of a signal 201 of FIG. 11.

Diagram (b) shows a signal after it has passed through a band filter, from which it will be recognized that harmonics components have been removed. A signal 204 of FIG. 11 just corresponds to this signal.

Diagram (c) shows an output signal of the sample holding circuit. A signal 204' of FIG. 11 corresponds to this signal. Diagram (d) shows digital signals of shaft vibration converted through the A/D converter. A signal 205 of FIG. 11 is corresponding to this signal. In the diagram (d), the signal has been converted into a digital signal consisting of 11 bits (MSD, however, is a sign bit) with respect to the output signal 204' of the sample holding circuit.

As mentioned already, in the case of the FHT, these time series digital signals will be fed to the samples $X_0$, $X_1$, $X_2$,—$X_7$ of FIG. 6, so that the element u is operated to find the sequency coefficients $A(0)$, $A(1)$, $A(2)$,—$A(7)$. To transform them into Fourier coefficients $a_0$, $a_2$, $b_1$,—$b_4$, the transform coefficients shown in Table 2 will be used. Here, for the purpose of simplicity, although the number of samples is $N=8$ ($X_0$, $X_1$, $X_2$,—$X_7$), the number of samples will be practically expanded to 256, 512, 1024 or greater as mentioned earlier.

Diagram (a) of FIG. 13 shows the state of vibration amplitudes at the time of starting the trubogenerator. There exist several critical speed regions where the vibration amplitude increases before a rated running speed is reached. Usually, the first critical speed region lies near 1000 rpm, the second critical speed region lies in the vicinity of 2000 rpm, and the third, fourth and fifth critical speed regions develop from about 3000 to 3400 rpm.

Diagram (b) of FIG. 13 shows a general speed-raising pattern during the starting period, in which symbols A to D are corresponding to A to D of the diagram (a). According to the present invention, the frequencies of vibration signals are analysed in these sheltered speed regions to diagnose the condition of the torbogenerator based on the specturm analysis of all frequencies, or to diagnose the conditions of particular frequency components having predetermined relation to the running speeds as shown in Table 1, thereby to control the operation.

FIG. 14 shows the case in which the diagnosis is carried out by setting threshold values. The abscissa represents the component of running speed indicated in terms of a ratio dB with respect to the vibration amplitude 100 microns (peak to peak), or in terms of a ratio dB with respect to the over-all frequency components, or in terms of an absolute value, or in various other forms. The ordinate, in this case, represents a frequency component of $\frac{1}{2}$ running speed. Like the case of the abscissa, the quantity will be indicated in terms of a ratio dB or in terms of an absolute value.

Referring to FIG. 14, symbol U represents a speed-raising region where the running speed is accelerated, H a holding region where the running speed is held constant, D a region where the machine is operated at a lower sheltered speed, and symbol T represents a trip region where the operation is stopped. That is, in the region U, the running speed will be accelerated according to the start-up schedule (or speed-raising schedule) shown in the diagram (b) of FIG. 13. The start-up schecule signal is produced, for example, by the turbine start-up scheduler 46 of FIG. 10.

In the region H, the operation is carried out for a predetermined period of time maintaining a predetermined speed. When the running speed is still in the region H even after the predetermined period of time has passed, the operation is performed by lowering the running speed to a lower sheltered speed. Here, if it is supposed that the machine is operating in the region C in the diagram (a) of FIG. 13, the operation in the lower sheltered region means that the operation is carried out in the speed region B. This means that even if the running speed is in the region H, the operation is carried out at a reduced speed just like in the region D after the operation has been performed for a predetermined period of time maintaining the constant speed.

With reference to the region D, when the operation performed in the region C of FIG. 13 reached the region D of FIG. 14, the operation thereafter is carried out by lowering the speed to the region B of FIG. 13.

FIG. 14 shows the relation between the components of the running speed and the components of the halved running speed. Even if the components of the halved running speed are small, the increase in the components of the running speed may lead the operation to the tripping region. The reason is because, as will be obvious from Table I, the cause of vibration different from the misalignment of bearings may have been developed, for example, thermal bending caused by rubbing may have been developed. FIG. 14 shows a relation between the components of the running speed and the components of the halved running speed. Here, by monitoring the components of the $\frac{1}{2}$ running speed, components or critical speed, and components of the doubled running speed, it is possible to monitor and diagnose the causes of vibration.

To summarize the foregoing, below is mentioned with reference to flow diagrams of FIG. 15 the method of controlling the operation while diagnosing abnormal conditions according to the present invention.

A step 301 for processing the input introduces the running speed (rpm) of the turbine and generator as well as shaft vibration signals $X$ measured at each point of the bearings [(number of samples N)×(number of channels)]. A step 302 for extracting the initial symptoms finds the sequency coefficiencies $A(0)$ to $A(N-1)$ according to the equation (6). A step 303 for discriminating abnormal conditions finds a sequency spectrum $|A|$ in accordance with the equation (20), detects a deviation with respect to a sequency spectrum $|A\ normal|$ of operation under normal condition, and discriminates whether the deviation is great or small with respect to a predetermined small value L.

If, $$|A|-|A\ normal| \sqrt{L}$$

the steps 304 to 307 discriminate in which speed region among the resions A to B of FIG. 13 the turbine is running. Symbols A to D represent predetermined speed regions avoiding such regions that contain first, second, third, fourth and fifth critical speeds. Patterns I to IV corresponding to each of the speed regions are selected by means of steps 308 to 311.

An example of the pattern II is shown in the diagram (C) of FIG. 15. The pattern III is the same as the pattern II in regard to its abscissa and ordinate, but has different setpoint levels U, H, D and T. The pattern I shows the case in which the ordinate is $\frac{1}{4}$ R and $\frac{1}{2}$ R as shown in the diagram D of FIG. 15. In the case of the pattern I, the running speed is smaller than the first critical speed, and hence Rc may be neglected.

The pattern IV has a component 2R in addition to those of the patterns II and III of the diagram (C) of FIG. 15.

If now the turbine is running at a speed which pertains to the region B of FIG. 13, the pattern II is selected (step 309). In the next step 316 (diagram B of FIG. 15), the WFT processing is performed in accordance with the equation (17) to transform the sequency coefficient into a Fourier coefficient $a$ which indicates frequency components. As will be obvious from the diagram C of FIG. 15, the ordinate in this case represents $\frac{1}{4}$ R, $\frac{1}{2}$ R and Rc. Therefore, only the corresponding portions need be selected and operated in accordance with the equation (17). For example, the elements $a_0$, $b_{\frac{1}{4}R}$, $a_{\frac{1}{4}R}$, $b_{\frac{1}{2}R}$, $a_{\frac{1}{2}R}$, $b_{Rc}$ and $a_{Rc}$ should be operated. Further, as for the components of rotating frequencies represented by the ordinate of the diagram C of FIG. 15, the elements corresponding to $b_R$ and $a_R$ should be operated in accordance with the equation (17).

The subsequent steps 317 to 320 discriminate to which region among the operation patterns U, H, D and T of the diagram C of FIG. 15, the vibration signals pertain. In other words, the steps 317 to 320 discriminate in regard to $\frac{1}{4}$R, Rc and $\frac{1}{2}$R in the case of the pattern II. The corresponding speeds are than controlled (steps 321 to 324). Concretely speaking, the discriminated result is given as a setpoint value to the turbine speed regulator 55 prior to the start-up schedule signal which has been preset by the demand set device 47 of FIG. 10. The level of priority has a relation T>D>H>U, and the operation is performed based on a pattern having the highest level among the selected ones.

The step 313 displays the vibration spectrum (for example, by means of a cathode-ray tube), and the step 314 discriminates whether the processing has been performed for all channels. If the processing has not been effected for all channels, other channels are selected (step 315) to repeat the same processing. Here, the word "channels" represents vibration detectors 39 to 45 of FIG. 10.

Although the foregoing description has dealt with the case of operating the predetermined frequency components, such as frequency components of $\frac{1}{2}$R, the frequency components in the vicinity of the abovesaid components may also be operated to find average spectra. In that case, b($\frac{1}{2}$R+1), b($\frac{1}{2}$R−1), b($\frac{1}{2}$R) and a($\frac{1}{2}$R+1), a($\frac{1}{2}$R−1), a($\frac{1}{2}$R) should be calculated in accordance with the equation (17). An average value may also be found in regard to a predetermined region in the vicinity of particular frequency components. For instance, a calculation $\frac{1}{2}$R±r may be carried out in regard to a predetermined frequency region r with $\frac{1}{2}$R as a reference. That is, in the case of the equation (17), the calculation is carried out in regard to b($\frac{1}{2}$R±r) and a($\frac{1}{2}$R±r). Referring to Table 1, i=29, 30, 31 when p=1 are examples in the case of $\frac{1}{2}$R±1. Here, since $m_1$=6 has been selected, it is allowed to calculate the case $\frac{1}{2}$R±1, i.e., to calculate the cases i=14, 15 and 16.

To diagnose the conditions of a rotary machine based on the average frequency components in the vicinity of the preselected frequencies or including given regions in the vicinity of the preselected frequencies, is advantageous in regard to that erroneous diagnosis caused by noise signals from the vibration detectors can be avoided, and the deviation in sampling phases can be compensated. In the case of the pattern II, this can be represented as shown in the diagram E of FIG. 15.

In the step 303 of the diagram A of FIG. 15, the deviation is detected with respect to $|A \text{ normal}|$ in order to absorb dispersion caused by the rotary machines.

Diagrams (a) to (d) of FIG. 16 show one of the effects of the present invention.

Referring to the diagram (a), let it be supposed that the vibration amplitude signal at the present running speed is as shown in the diagram (b). The waveforms are smaller than the vibration amplitude. Therefore, no abnormal condition is detected with the conventional average value system. The vibration then gives rise to the occurrence of oil whirl phenomenon which produces vibration of excessive amplitude. On the other hand, if the frequencies are analysed and the spectrum is monitored as done by the present invention, it is possible to detect the symptom of oil whirl at a point ▽. Referring to the diagram (d), spectra indicated by black circles indicate such symptoms. It will be recognized that the test machine has a specific vibration frequency of 22.5 Hz, and the spectrum at this frequency is particularly greater than those of other frequencies. This indicates that there is a symptom of oil whirl.

According to the present invention, therefore, even when the vibration amplitude is small or even when the average value of the vibration amplitude is small, it is possible to foresee the development of any abnormal vibrations. It is therefore possible to detect abnormal vibrations in an early time to safely control the operation.

The ordinate of the diagram (d) of FIG. 16 represents frequency spectra normalized by peak-to-peak value of vibration waveforms.

FIG. 17 shows the case when the operation is started by applying the method of the present invention in comparison with the case when the operation is started according to the conventional art. A solid line represents the case to which is applied the present invention. According to the present invention, if abnormal condition is detected at a point ▽, the running speed is once decreased to a low-speed sheltered region, and the running speed is accelerated again to a rated running speed. According to the conventional art (broken line), on the other hand, the detection of abnormal condition is delayed as indicated by a point ▽. Consequently, the average value of vibration amplitudes plunges into the tripping region such that the operation is tripped. The operation therefore must be started again after the cause of abnormal condition has been clarified. Thus, the present invention is capable of detecting abnormal conditions in an early time, making it possible to avoid unnecessary tripping.

Furthermore, a deviation $e$ between the measured sequency spectrum $a$ and the standard value $a_s$ may be compared with a predetermined allowable value to discriminate abnormal condition. These relations are given by equations (20) to (22).

$$|I| = \sqrt{A_{2k}^2 + A_{2k+1}^2} \qquad (20)$$

$$k = 0 \sim \left(\frac{N}{2} - 1\right)$$

$$|s| = \sqrt{A_{s2k}^2 + A_{s2k+1}^2} \qquad (21)$$

$$e = |I| - |s| \qquad (22)$$

Rotary members such as turbines and generators contain residual unbalance to some extent introduced during the steps manufacturing and installation. When the rotary members are rotated, therefore, the residual unbalance produces exciting force which creates vibration of shaft with the components of running speed as centers even under normal conditions. Therefore, during the initial stage of acceleration, it is difficult to detect the development of abnormal condition even when it is developed because the vibration components under the normal condition work as disturbance. To detect abnormal characteristics maintaining high degree of sensitivity, therefore, the vibration characteristics under normal condition should be stored beforehand, and the deviation therefrom should be monitored. With the monitoring in the conventional time regions, however, it is difficult to bring the stored vibration waveforms under normal condition into phase with the vibration waveforms measured each time.

According to this embodiment, however, the waveforms are transformed into sequency coefficients and compared with the characteristics under normal condition, whereby the effects of phase need not be taken into consideration.

The foregoing embodiment of the present invention has dealt with the case of analyzing the frequencies by means of digital signals. The frequencies, however, may be analyzed based on analog signals. In that case, however, it is necessary to employ an analog filter which is capable of automatically changing the time constant responsive to the running speed of the rotary machines. It is because the frequency components must be analysed with reference to the frequencies related to the rotating frequency as shown, for example, in the diagram C of FIG. 15. However, the filter for specific vibration frequency determined from the characteristics of the rotary machine, may have a fixed time constant.

When abnormal conditions under rated running speed are to be diagnosed, filters having time constants determined for their respective requirements may be employed.

What is claimed is:

1. A method of controlling a build-up speed of a rotary machine with a vibration-monitoring system comprising a vibration-responsive means preferably containing at least one vibration transducer mounted on a bearing, a running speed detector which transduces signals responding to the rotary machine speed, a diagnosing device with a frequency analyzer which analyzes a vibration signal from the vibration transducer, and a speed regulator which controls the speed of the rotary machine responding to demand signals as a result of the vibration frequency analysis, comprising:

a first step of discriminating in which speed region a running speed of the rotary machine lies among a plurality of predetermined speed regions which are obtained by dividing the speed range, from start up to rated speed of the rotary machine, into critical speeds, a second step of calculating harmonic components of a frequency spectrum which are predetermined in the respective divided speed regions, a third step of discriminating as to which one of a plurality of predetermined operating patterns corresponds to said calculated harmonic components of the frequency spectrum, which patterns include a speed raising region and a speed lowering region, which are closely related with components of rotation frequency, and a fourth step of performing a predetermined speed control operation of the rotary machine depending on the discrimination result in said third step.

2. A method according to claim 1, wherein a build-up speed is controlled while monitoring the harmonic components of frequency corresponding to one-half of the rotation frequency of said rotary machine, and is controlled in accordance with said patterns which have been determined beforehand in response to the harmonic components of said rotation frequency.

3. A method according to claim 1, wherein a build-up speed is controlled with monitoring the harmonic components corresponding to one-third of the rotation frequency in the running speed of said rotary machines, and is controlled in accordance with said patterns which have been determined beforehand in response to the harmonic components of said rotation frequency.

4. A method according to claim 1, wherein a build-up speed is controlled with monitoring the second harmonic of the fundamental frequency in the running speed of said rotary machines, and is controlled in accordance with said patterns which have been determined beforehand in response to the harmonic components of said rotation frequency.

5. A method according to claim 1, wherein a build-up speed is controlled with monitoring the components of a specific frequency corresponding to a critical speed of the rotary machines, and is controlled in accordance with the patterns which have been determined beforehand in response to the components of said specific frequency.

6. A method according to claim 1, wherein the build-up speed control operation patterns include a speed-raising region, a speed-holding region, a speed-lowering region in which the running speed is lowered to a region smaller than a critical speed closest to the running speed in said holding region, and a tripping region, responsive to the harmonic components of vibration signals, and the build-up speed is controlled in accordance with said speed control operation patterns.

7. A method according to claim 1, wherein the vibration signals are analyzed, and the harmonic components of the rotation frequency, the harmonic components of a frequency corresponding to one-half of the rotation frequency, the harmonic components of a frequency corresponding to one-third of the rotation frequency, the second harmonic of the fundamental frequency in the running speed, and the components of a specific frequency corresponding to the critical speed of the rotary machines are simultaneously monitored, and the build-up speed is controlled according to the operation pattern of the highest level among their harmonic components.

8. A method according to claim 1, wherein the harmonic components in a region corresponding to ($\frac{1}{2} \pm r$)(- wherein r is a natural number of 1, 2, ...) of the components of the rotation frequency are monitored.

9. A method according to claim 1, wherein the harmonic components in a region corresponding to $(\frac{1}{2} \pm r)$ (wherein r is a natural number of 1, 2, ...) of the components of the rotation frequency are monitored.

10. A method according to claim 1, wherein the harmonic components in a region corresponding to $(2 \pm r)$ (wherein r is a natural number of 1, 2, ...) of the components of the rotation frequency are monitored.

11. A method according to claim 1, wherein the harmonic components in a region in the vicinity r of a specific frequency to the rotary machine are monitored.

* * * * *